United States Patent [19]
Yamauchi

[11] Patent Number: 6,052,061
[45] Date of Patent: *Apr. 18, 2000

[54] CIRCUIT FOR SWITCHING A PROTECTION LINE BETWEEN A COMMON SECTION AND A CHANNEL SECTION

[75] Inventor: Daiichiro Yamauchi, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/735,569

[22] Filed: Oct. 23, 1996

Related U.S. Application Data

[63] Continuation of application No. 08/266,560, Jun. 28, 1994, abandoned.

[30] Foreign Application Priority Data

Jan. 10, 1994  [JP]  Japan .................................. 6-013241

[51] Int. Cl.⁷ .............................. H04Q 1/00; H04Q 3/00
[52] U.S. Cl. .................... 340/825.16; 370/242; 370/247; 379/26; 371/48; 324/539; 361/88
[58] Field of Search .......................... 340/825.01, 825.03, 340/825.16, 827, 825.89; 359/117; 370/223–228, 242–247, 216, 217; 307/116; 379/2, 26; 371/57.1, 48; 455/8; 1/1; 324/539; 361/88

[56] References Cited

U.S. PATENT DOCUMENTS

| | | | |
|---|---|---|---|
| 4,395,772 | 7/1983 | Trested, Jr. | 340/825.03 |
| 4,435,704 | 3/1984 | Hashimoto et al. | 340/825.05 |
| 4,747,036 | 5/1988 | Ichikawa et al. | 363/54 |
| 4,831,617 | 5/1989 | Iwasaki | 370/16 |
| 4,837,760 | 6/1989 | Reid et al. | 370/16 |
| 4,837,856 | 6/1989 | Glista, Jr. | 340/825.05 |
| 4,914,625 | 4/1990 | Billian | 340/825.05 |
| 5,003,531 | 3/1991 | Farinholt et al. | 340/825.01 |
| 5,313,456 | 5/1994 | Sugawara | 340/827 |
| 5,323,144 | 6/1994 | Imai et al. | 340/825.16 |
| 5,377,180 | 12/1994 | Laurent | 340/827 |
| 5,414,414 | 5/1995 | Suzuki | 340/825.01 |
| 5,469,428 | 11/1995 | Tokura et al. | 340/825.01 |

FOREIGN PATENT DOCUMENTS

| | | | |
|---|---|---|---|
| 4123561 | 4/1992 | Japan | 340/825.16 |
| 4260255 | 9/1992 | Japan | 340/825.16 |
| 5145972 | 6/1993 | Japan | 340/825.16 |

*Primary Examiner*—Michael Horabik
*Assistant Examiner*—William H. Wilson, Jr.
*Attorney, Agent, or Firm*—Armstrong, Westerman, Hattori, McLeland & Naughton

[57] ABSTRACT

A circuit for performing a switching of a protection line between a common section and a channel section includes a common section and a channel section connected by signal lines. The common section has a working interface circuit and a protecting interface circuit. The channel section only has a working interface circuit. The working interface circuit of the common section is operably connected to the working interface circuit of the channel section by a working cable. The protecting interface circuit of the common section is connected to the working interface circuit of the channel section by a protecting cable. When a disconnection or a slip of the working cable occurs, a signal from the working interface circuit of the common section is transmitted and inputted into the protecting interface circuit via the protecting cable.

9 Claims, 4 Drawing Sheets

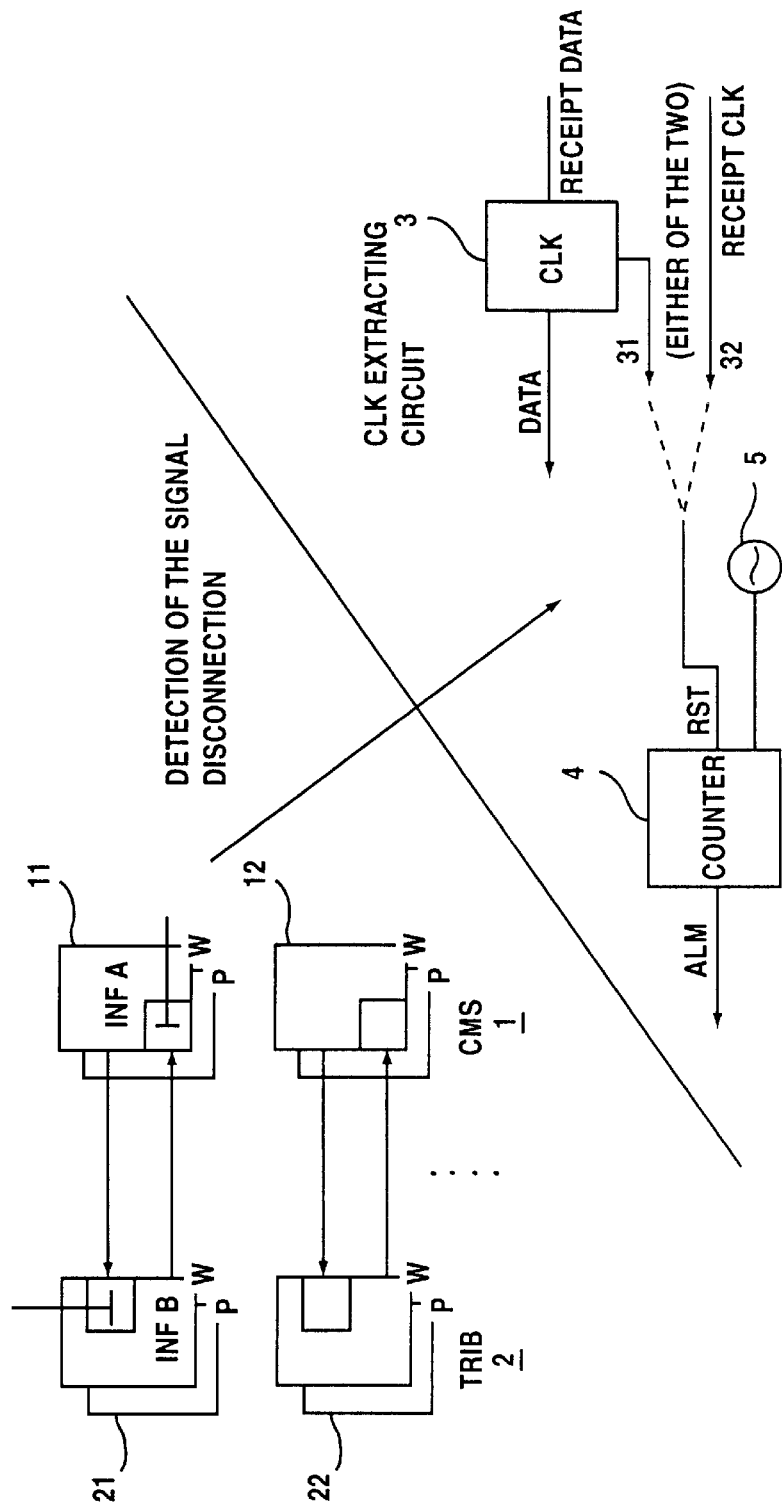

CIRCUIT FOR SWITCHING A PROTECTION LINE BETWEEN A COMMON SECTION AND A CHANNEL SECTION

This application is a continuation application of Ser. No. 08/266,560 filed Jun. 28, 1994, now abandoned.

BACKGROUND OF THE INVENTION

1. Field of the Invention

The present invention generally relates to a signal line switching circuit. More particularly, this invention relates to a circuit for performing a switching operation of a protection line between a common section and a channel section.

2. Description of the Prior Art

In a communication system, there are many structural arrangements for connecting a channel section having an interface function with a lower level system to a common section having a function for monitoring the entire system, an interface function with the higher level monitoring system or an interface function with other equipments via a signal line.

These structural arrangements generally function to bypass a disabled communication by switching the signal line to a protection line when a communication fault occurs to the interface functions. The conventional structural arrangements illustrated in FIG. 4, for example, function in this manner. It is noted that in FIG. 4(a), reference numeral "1" is the common section (CMS), whereas numeral "2" is the channel section (TRIB).

In the case where multiple channels (CH) are connected to the common section (CMS), interface circuits 21, 22, 23 corresponding to multiple channels (CH) are provided on the channel section (TRIB) 2. Similarly, interface circuits 11, 12 are provided on the common section (CMS) 1, corresponding to the interface circuits 21, 22 located on the channel sections (TRIB) 2.

Additionally, in FIG. 4, two interface circuits 21, 22 are shown representative of the multiple interface circuits on the channel section (TRIB) 2. Further, the interface circuits 11, 12 on the common section (CMS) 1, which are provided corresponding to two interface circuits 21, 22 on the channel section (TRIB) 1, are shown.

Furthermore, each of the interface circuits 11, 12, 21, 22 of the common section (CMS) 1 and the channel section (TRIB) 2 has a circuit for protection (P), as well as a working circuit (W), to prevent the occurrence of a communication disability by switching from the working circuit to the protecting circuit when the disconnection of the signal is detected. Consequently, in the conventional device illustrated in FIG. 4, the disconnection signal is detected by either a clock 31 outputted from a clock extracting circuit 3 from a data-receiving section (receipt data section) or a clock 32 prepared at the receipt side synchronizing with the received data in the data-receiving section.

That is, a counter 4 for counting signal 5, shown in FIG. 4, is further provided, wherein the counter 4 is reset with the clock 31 or the clock 32. Accordingly, the counter 4 continues to count without being reset when the signal disconnection is continued. The alarm is subsequently generated; and the signal disconnection is detected when the counted value reaches a predetermined value.

With the above-discussed conventional structural arrangement, when multiple channel sections (TRIB) are connected to the common section (CMS), the number of interface circuits becomes too large; i.e., the channel number to be handled becomes too large so that the disconnection signals to be detected and the interface circuits for the protection lines become unnecessarily numerous.

Moreover, in the above-discussed conventional structural arrangement, as the disconnection signal is detected by using the clock, the circuit for detecting disconnection has to comprise many parts; thereby, resulting in the use of a large mounting area, the increase in cost due to numerous needed parts, and the increase in power supply consumption.

It is therefore an object of the present invention to provide a signal line switching circuit for solving the abovediscussed problems of the conventional structural arrangement.

SUMMARY OF THE INVENTION

The signal line switching circuit according to the present invention comprises a common section (CMS) and a channel section (TRIB) having interface circuits, respectively, connected by a signal line, wherein the common section (CMS) has a working interface circuit (W) and a protecting interface circuit (P).

The channel section (TRIB) only has a working interface circuit (W). Further, the working interface circuit (W) on this common section (CMS) and the interface circuits on the channel section (TRIB) are connected by a cable (a so-called "working cable"); and the protecting interface circuit (P) on the common section (CMS) and the interface circuit on the channel section (TRIB) are connected by another cable (a so-called "protecting cable"). The signal transmitted from the working interface circuit (W) of the common section (CMS) is outputted to the protecting interface circuit (P) via the protecting cable when a disconnection of the working cable occurs.

In the present invention, the signal line switching circuit has a working interface circuit and a protecting interface circuit on the common section (CMS), while the channel section (TRIB) only has a working interface circuit. Moreover, the working interface circuit and the protecting interface circuit on the common section (CMS) are connected in parallel to the interface circuits on the channel section (TRIB) via the working cable and the protecting cable.

Accordingly, the signal transmitted from the common section (CMS) reaches the interface circuit on the channel section (TRIB) even if either the working interface circuit and the protecting interface circuit on the common section (CMS) becomes faulty.

Furthermore, each of the working interface circuit and the protecting interface circuit on the common section (CMS) and the interface circuit on the channel section (TRIB) include a detecting circuit for detecting the disconnection or the slip of working and protecting cables.

These detecting circuits are connected to the ground on the corresponding channel section (TRIB) or the common section (CMS) via the working and protecting cables. Accordingly, when the disconnection or the slip of the cables occurs, the voltage potential is shifted from the ground potential so that this potential variation is detected in the detecting circuit.

BRIEF DESCRIPTION OF THE DRAWINGS

FIG. 4 is a diagram for use in explaining the prior art.

DETAILED DESCRIPTION OF THE PREFERRED EMBODIMENTS

FIG. 1 is a diagram for explaining one example of an equipment employed in the present invention. In the following explanation of this embodiment, the same numerals and symbols are used for parts which are identical or similar.

Figure 1A:
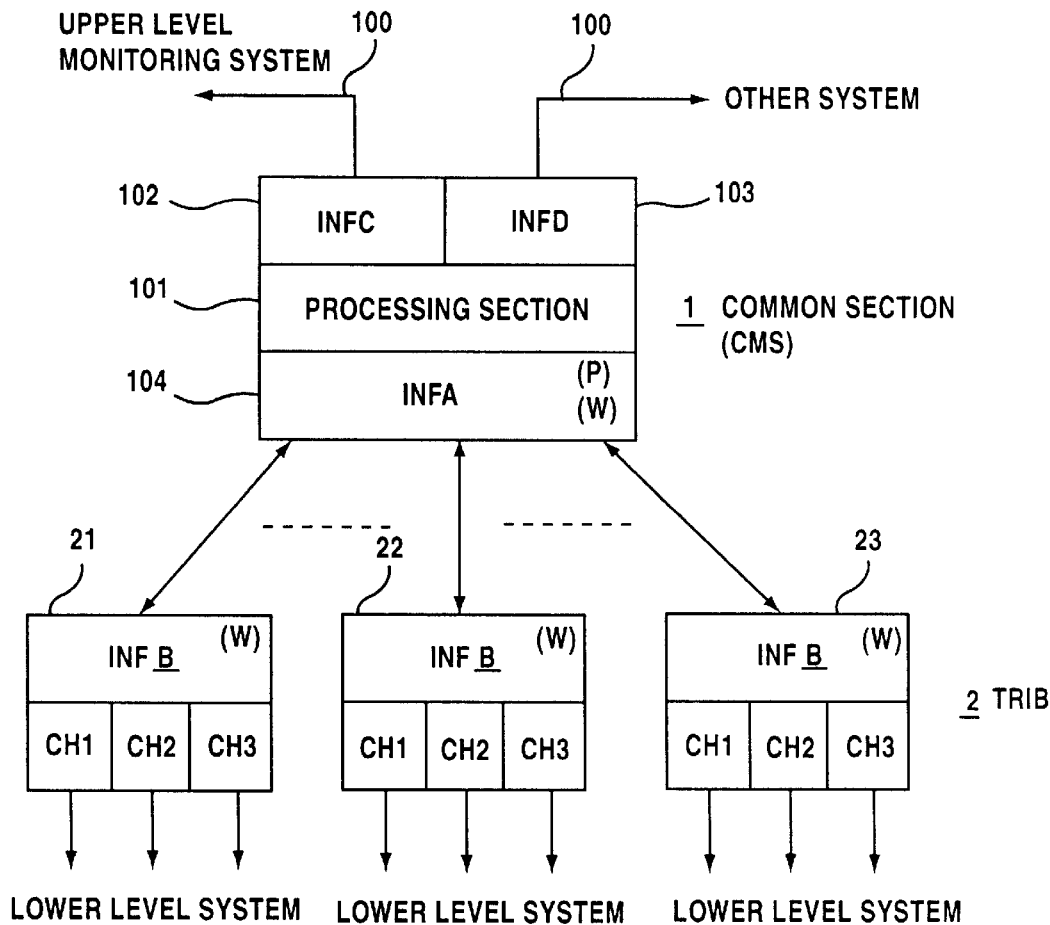
FIG. 1 is a diagram for use in explaining an example applicable to the present invention, FIG. 1(a) showing a relationship between a common section (CMS) and a channel section (TRIB), and FIG. 1(b) being a diagram for use in explaining a location of an equipment on, as an example, a ring-type recursive networking.
Figure 1B:
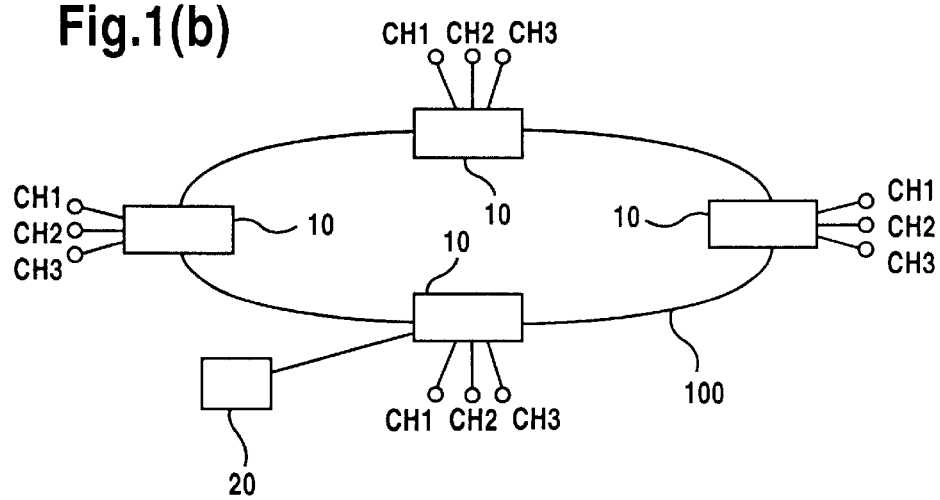

FIG. 1(a) shows the relationship between the common section (CMS) 1 and the channel section (TRIB) 2; and FIG. 1(b) is a diagram for explaining the location of the equipment according to the present invention on, as one example, a ring-type recursive networking.

In FIG. 1(b), an equipment 10 embodying the present invention is located in each node of the recursive networking having a ring shape formed by a transmission path 100. The equipment 10 is further provided with the common section (CMS) and the channel section (TRIB) 2, as shown in FIG. 1(a).

Furthermore, in FIG. 1(b), reference numeral "20" refers to an upper level monitoring circuit which is connected to one of the nodes, and monitors the status of the networking based on the information received from each node of the recursive networking.

In again referring to FIG. 1(a), the common section (CMS) 1, having a processing section 101, is connected to the upper level monitoring system or other systems via an interface circuit (Infc) 102 and an interface circuit (Infd) 103, respectively. Accordingly, the upper level monitoring system signifies the upper level monitoring circuit 20 as shown in FIG. 1(b) or a monitoring signal being sent from the upper level equipment connected via the transmission path 100.

Moreover, the common section (CMS) 1 is connected to the multiple channel groups 21, 22, 23 via the channel section (TRIB) 2 and the interface circuit (Infa) 104. On the other hand, the interface circuits (Infb) are also provided on the multiple channel groups 21, 22, 23 connected to the common section (CMS) 1.

Additionally, in the embodiment illustrated in FIG. 1(a), the channel groups 21, 22, 23 have three channels CH1, CH1, CH3, respectively. Further, each of the channels CH1, CH1, CH3 is connected to a lower level system.

The interface circuit (Infa) 104 of the common section (CMS) 1 of this invention includes both a working circuit (W) and a protecting circuit (P). On the other hand, the interface circuit (Infb) provided in the multiple channel groups 21, 22, 23 on the channel section (TRIB) 2 is provided only with a working circuit (W).

Accordingly, in the present invention, the interface circuit (Infb) may only have a working circuit (W) so that it becomes possible to prevent the increase in the size of the equipment even if the channel groups, connected to the common section 1, increase in number.

Figure 2:
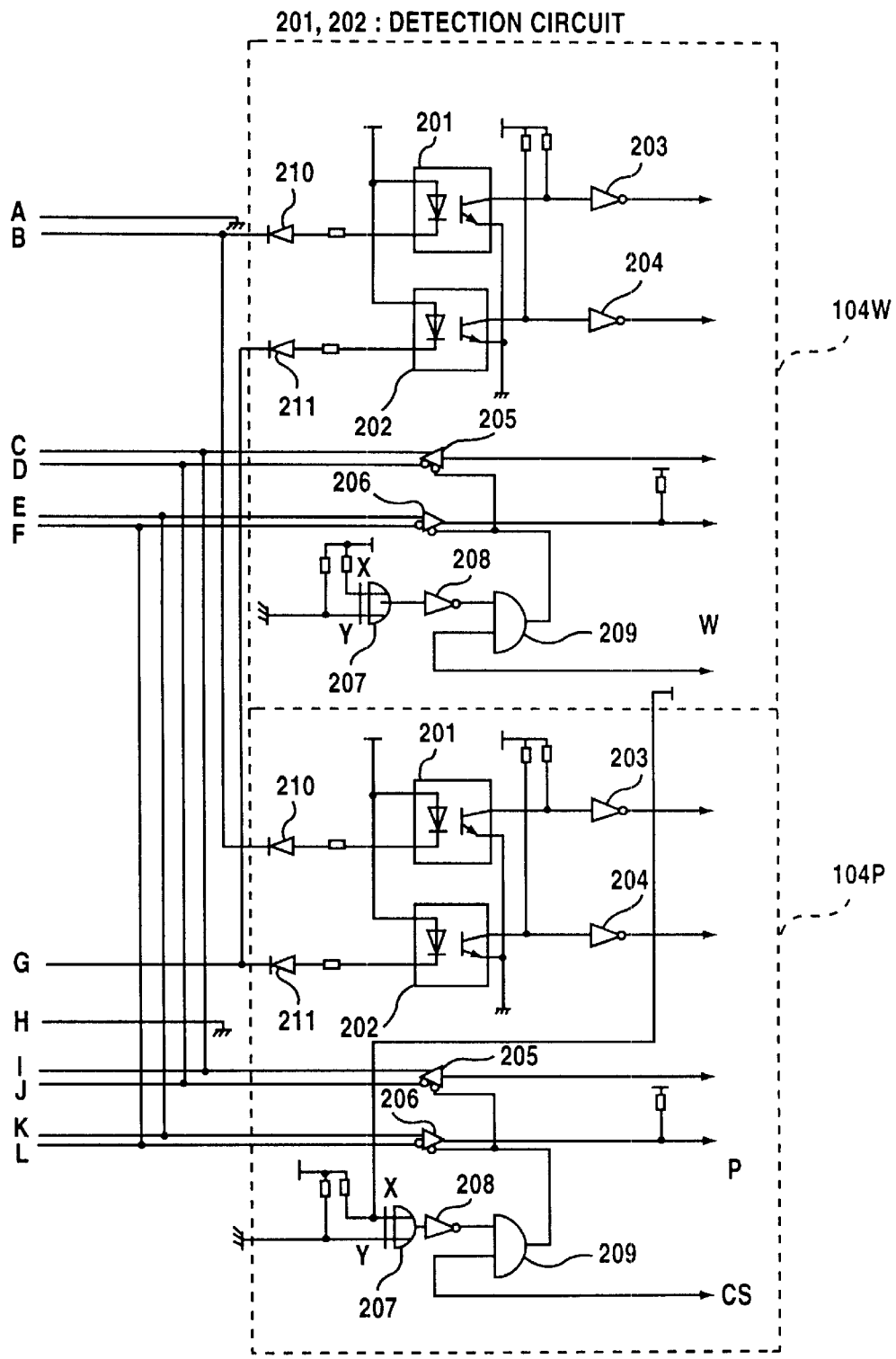
FIG. 2 is a diagram showing a structural arrangement of a first half of the circuit of the embodiment according to the present invention.
Figure 3:
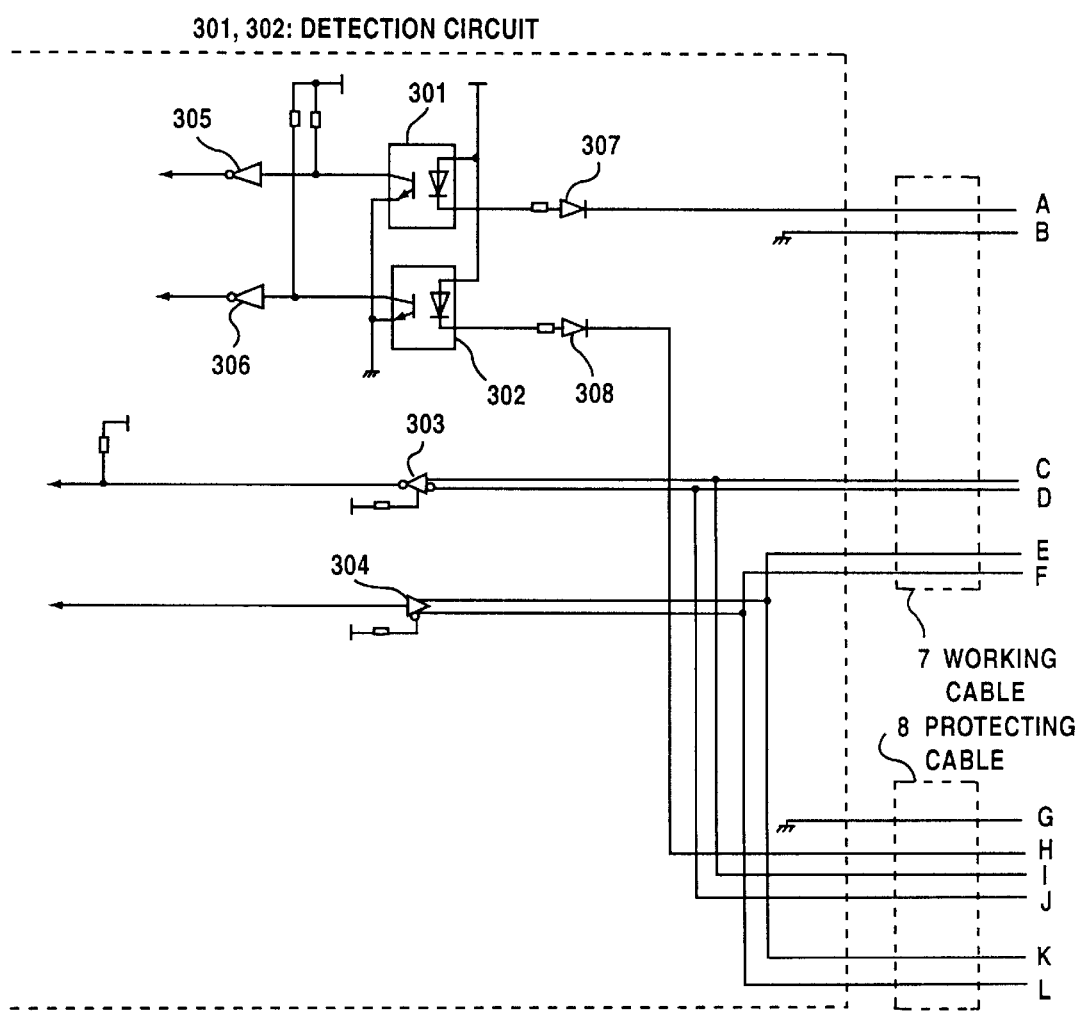
FIG. 3 is a diagram showing a structural arrangement of a second half of the circuit of the embodiment according to the present invention.

FIGS. 2 and 3 show the circuit of the embodiment of the present invention corresponding to the above-discussed example concerning FIG. 1 by dividing the diagram in two. FIG. 2 is a diagram showing the circuit of the embodiment of the interface circuit (Infa) of the common section (CMS) 1; and FIG. 3 represents one of the interface circuits (Infb) provided to the multiple channel groups 21, 22, 23 of the channel section (TRIB) 2.

As illustrated in FIG. 1, the interface circuit (Infa) 104 of the common section (CMS) 1 has a working circuit (W) and a protecting circuit (P), and each of these circuits has the same circuit structure.

On the other hand, FIG. 3 illustrates an interface circuit (Infb) on the channel section (TRIB) 2 which is provided with one circuit for each channel group. The interface circuit of the common section (CMS) 1 shown in FIG. 2, and the interface circuit of the channel section (TRIB) 2 shown in FIG. 3 are linked in correspondence to the lines A through L. As described above, FIG. 3 shows one interface circuit of the channel section (TRIB) 2. Although other interface circuits are not shown in this diagram, the circuits are connected to the interface circuit 104 and the lines A through L on the common section (CMS) 1 in parallel. Further in FIG. 3, reference numbers "7" and "8" refer to the working cable and the protecting cable for connecting the interface circuits (Infa) 104 on the common section (CMS) 1 and the interface circuits on the channel section (TRIB) 2.

During normal operations, the signal transmitted from the common section (CMS) 1 initially passes through a driver 205 of the working interface circuit 104W, passes through the working cables 7C, 7D and the protecting cables 8I, 8J, and is thereafter inputted to the receiver 303 of the interface circuit (Infb) on the channel section (TRIB) 2. The signal transmitted from the protecting interface circuit 104P initially passes through the driver 304, then passes through the working cables 7E, 7F and the protecting cables 8K, 8L, and is thereafter inputted to the receiver 206 of the working interface circuit 104W in the common section (CMS) 1. Consequently, the output of an AND gate 209 of the protecting circuit P is at an 'H' level, according to a control signal CS, so as that the driver 205 and the receiver 206 in the protecting interface circuit 104P of the common section (CMS) 1 become disabled. Meanwhile, the output of the AND gate 209 is at an 'L' level, according to the control signal CS in the working circuit W so as that the driver 205 and the receiver 206 on the working circuit W become enabled.

The following descriptions concern the occurrence of an abnormal condition. The equipment, as shown in FIG. 1, is set up in the same location so that the fault of the interface circuit other than the fault of the unit, the disconnection of the cable or the slip of the cable need not be necessarily considered.

Accordingly, in the present invention, as is apparent from the later explanations on FIGS. 2 and 3, the working interface circuit 104W is switched to the protecting interface circuit 104P without detecting the disconnection of the clock signal when the slip or the disconnection of the cable occurs, unlike in the prior art shown in FIG. 4. In other words, when the cable 7 connected to the working circuit W is disconnected or slips, the signal outputted from the driver 205 in the working interface circuit 104W is inputted into the receiver 303 of the interface circuit in the channel section 2 via the protecting cable 8. Moreover, the signal outputted from the driver 304 of the protecting circuit P is also transmitted through the protecting cable 8, and inputted into the receiver 206 of the working interface circuit 104W of the common section (CMS) 1. Accordingly, with the above-described structural arrangements, the transmitted signal is maintained even if the disconnection or the slip of the working cable 7 occurs.

Furthermore, when the working interface circuit 104W of the common section (CMS) 1 is disconnected or slips, the input X of the exclusive OR logic gate in the protecting interface circuit 104P becomes an 'H' level and is reversed by the inverter 208 so that the input of the AND gate 209 becomes an 'L' level. Accordingly, the output of the AND gate 209 is at the 'L' level so that the driver 205 and the receiver 206 of the protecting interface circuit 104P become enabled. Accordingly, a signal is generated and transmitted from the driver 205 on the protecting interface circuit 104P and is inputted into the receiver 303 of the interface circuit of the channel section (TRIB) 2 via the working cable 7 and the protecting cable 8.

On the other hand, the signal outputted from the driver 304 of the interface circuit of the channel section 2 is inputted into the receiver 206 of the interface circuit of the common section (CMS) 1 via the working cable 7 and the protecting cable 8.

The detection during the occurrence of the disconnection of the cable or the slip of the cable is hereinafter described. The working interface circuit 104W and the protecting interface circuit 104P of the common section (CMS) 1, 201, 202 are the circuits which perform detection in the case where the disconnection or the slip of the cable occurs. In other words, the detecting circuits 201, 202 are photocouplers which are comprised of sets of light emitting devices, such as, LED (light emitting diode) or laser diode, and photo detecting devices, such as, avalanche photodiode or phototransistor. The light emitting devices of the detecting circuit 201 of the working interface circuit 104W and the detecting circuit 201 of the protecting interface circuit 104P are connected via the line B of the working cable 7 to the ground in the channel section (TRIB) 2. The light emitting devices of the detecting circuit 202 of the working interface circuit 104W and the detecting circuit 202 of the protecting interface circuit 104P are connected via the line G of the protecting cable 8 to the ground in the channel section (TRIB) 2.

Accordingly, in the absence of any fault, currents flow through the photocouplers 201, 202. The outputs of respective photocouplers 201, 202 is a an 'L' level, and are reversed to an 'H' level by the inverters 203, 204 so that the outputs are detected as being normal. When a fault occurs, such as, e.g., the occurrence of the disconnection or the slip of the working and protecting cables, the current does not flow through the detecting circuit 201 or detecting circuit 202 which corresponds to the side where the fault occurs. Accordingly, the output is at the 'H' level, and reaches an 'L' level by the reversal of the inverter 203 or inverter 204 so that the outputs are detected as being abnormal. Thus, the control signal CS is reversed, the driver 205 and the receiver 206 of the working interface circuit 104W are disabled, the driver 205 and the receiver 206 of interface circuit 104P are enabled, and the interface circuit in the common section (CMS) 1 is switched from the working interface circuit 104W to the protecting interface circuit 10P.

On the other hand, the detection of the disconnection or the slip of the cable is performed on the channel section (TRIB) 2. In other words, the detecting circuits 301, 302, which are comprised of the photocouplers, and the inverters 305, 306, as shown in FIG. 3, have the same structure and function as the detecting circuits 201, 202 and the inverters 203, 204 in the common section (CMS). More particularly, the light emitting devices of the detecting circuits 301 and 302 are connected to the ground in the common section (CMS) 1 and generate an output at an 'L' level from the inverters 305, 306 for the disconnection or the slip of the cable.

Furthermore, in FIGS. 2 and 3, the diodes 210, 211, 307, 308 connected to the light emitting devices of the detecting circuits 201, 202, 301, 302 are provided so to prevent the flow of the inverse current.

According to the above-described embodiments of the signal line switching circuit of the present invention, the common section (CMS) 1 functions, in common, for the multiple channel groups of the channel section (TRIB) 2. Moreover, each of the interface circuits is comprised of only the working circuit W. Thus, the signal line switching circuit of this invention advantageously reduces the required parts; and thus, reduces the cost and size for providing such a signal line switching system.

The above description is included to illustrate the structural arrangement and the operation of the preferred embodiments, and is not meant to limit the scope of this invention. The scope of this invention is to be limited only by the following claims. From the above discussion, many variations are apparent to one skilled in the art which would yet be encompassed by the spirit and scope of this invention.

What is claimed is:

1. A signal switching system, comprising:

a common section having a pair of working and protection interface circuits;

a plurality of channel sections, each having a working interface circuit connected to the working and protection interface circuits of said common section respectively via both working and protecting cables through which a data signal is transmitted from one of the working and protection circuits and connected to said pair of working and protection interface circuits of the common section via detection cable, a potential level on the detection cable being changed when the working cable connecting the working interface circuit of the channel section to the working interface circuit of the common section is disconnected or slipped; and a control circuit for controlling, for each channel section, the data signal to flow via the protection cable connected between the working interface circuit of the common section and the working interface circuit of the channel section, when said potential level is changed.

2. The signal line switching system according to claim 1, wherein each of said working interface and protection interface circuits of the common section, and the working interface circuit of each of the plurality of channel sections has a driver and a receiver, the drivers of the common section are connected via both the working and protecting cables to the receivers of each of the plurality of channel sections to transmit same data to both the working and protecting cables, and the drivers and receivers of the working interface and protection interface circuits of the common section are enabled or disabled by a control generated by the control circuit when the potential level on the detection cable is changed.

3. The signal line switching system according to claim 2, wherein each working interface circuit of said plurality of channel sections includes a first detecting circuit and a second detecting circuit for detecting a disconnection or a slip of a corresponding working cable or a corresponding protection cable, respectively, wherein each detection cable includes a pair of detection lines, respectively, along the working cable and the protection cable, and said first detecting circuit is connected via a first one of the pair of detection lines to a ground potential at the working interface section of said common section, while the second detecting circuit is connected via a second one of the pair of detection lines to said ground potential at the protection interface section of said common section.

4. The signal line switching system according to claim 3, wherein each of the first and second detecting circuits includes photocouplers having at least a photodiode and a phototransistor.

5. The signal line switching system according to claim 3, wherein photodiodes of said photocouplers of said first and second detecting circuits are connected to the pair of detection lines to detect change of a potential level thereon.

6. The signal line switching system according to claim 1, wherein each detection cable includes a first pair of detection lines having one end grounded at a corresponding one of the plurality of channel sections, and a second pair of detection lines having one end grounded at the common section, each of said working interface and protection interface circuits of said common section includes a first detecting circuit connected to the other end of one of the first pair of detection lines and a second detecting circuit connected to the other end of the other of the first pair of detection lines for detecting said potential level changed on said detection cable when a disconnection or a slip of a corresponding one of the working cable or the protection cable is made, respectively, and the working interface of each of the plurality of channel sections includes a first detecting circuit connected to the other end of one of the second pair of detection lines and a second detecting circuit connected to the other end of the other of the second pair of detection lines for detecting said potential level changed on said detection cable when a disconnection or a slip of a corresponding one of the working cable or the protection cable is made, respectively.

7. The signal line switching system according to claim 6, wherein each of the first and second detecting circuits of the common section include photocouplers having at least a photodiode and a phototransistor.

8. The signal line switching system according to claim 7, wherein said photodiode of said photocouplers of said first and second detecting circuits of the common section are connected to the first pair of detection lines and the photodiode of said photocouplers of said first and second detecting circuits of each working interface circuit of said plurality of channel sections are connected to the second pair of detection lines.

9. The signal line switching system according to claim 1, wherein each of said plurality of channel sections includes only one working interface circuit.

* * * * *